T. Dooley,
Making Toe Calks.

No. 78,581.     Patented June 2, 1868.

Witnesses;
S. B. Kidder
M. W. Frothingham

Inventor;
Thomas Dooley
By his Attys
Crosby Halsted & Gould

United States Patent Office.

THOMAS DOOLEY, OF SOUTH BOSTON, MASSACHUSETTS.

*Letters Patent No. 78,581, dated June 2, 1868.*

IMPROVEMENT IN THE MANUFACTURE OF TOE-CALKS, AND BLANKS FOR THE SAME.

*The Schedule referred to in these Letters Patent and making part of the same.*

TO ALL WHOM IT MAY CONCERN:

Be it known that I, THOMAS DOOLEY, of South Boston, in the county of Suffolk, and State of Massachusetts, have invented an Improved Toe-Calk, and a Blank for the same; and I do hereby declare that the following, taken in connection with the drawings which accompany and form part of this specification, is a description of my invention sufficient to enable those skilled in the art to practise it.

This invention relates to such toe-calks as are, by welding to shoes for horses or other animals, made integral with the shoes.

Such toe-calks have heretofore been made of wrought iron, of steel, and of wrought iron entirely surrounded by steel.

My invention consists in a toe-calk, in which the surface which is welded to the shoe is of wrought iron, and in which the surface which comes into contact with the ground is of steel, and in a blank from which such toe-calks are cut or punched, said blank being shaped by rolling, and having a form of cross-section corresponding with the cross-section of a toe-calk, and having such a disposition of iron and steel therein that toe-calks formed therefrom shall present a surface and body of iron where the calks formed from the blank are to be welded to the shoe, and a surface and body of steel where the calks formed therefrom come into contact with the ground.

Calks formed entirely of iron weld easily to iron shoes, but lack the hardness necessary to endurance. Calks formed entirely of steel are unnecessarily expensive, and are welded to iron shoes with difficulty, and, in such welding, require the employment of borax, which adds to the expense. Calks which have a core of iron surrounded by steel unite the hardness of the steel with the toughness of the iron, but it is as difficult to weld such calks to iron shoes as it is to weld solid steel calks, and it requires the same use of borax.

The object of my invention is to produce toe-calks which shall be as lasting in wear as solid steel calks, or as toe-calks with a core of iron surrounded with steel, and which shall be less expensive in material than solid steel calks, and which shall be easily welded to iron shoes without the use of borax.

In practising my invention, I take bars of iron of a cross-section adapted to form calks of any desired size, under the treatment specified beyond, and of the requisite quality, and place them in piles flatwise upon each other in a case, leaving between the sides of the case, and between the edges of the bars, in adjacent piles, spaces of about an inch in width, which spaces I fill with charcoal, and then submit the case with its contents to heat in a furnace till the edges of the iron bars are converted into steel by absorption of carbon from the charcoal.

These bars, which are represented in diagram A, where the steel and iron are shown by different colors, are then rolled into shapes or blanks, having forms of cross-section like those shown in figs. 1 and 2—

Figure 1 being of a form suited for summer calks, and

Figure 2 being of a form suited for ice or winter calks, the blank being in plan as is represented in Figure 3.

The blanks shown are rolled with a web from which are formed, in cutting or punching to separate the blank into calks, steady-pins such as are commonly used to secure each calk to a shoe while taking the heat by which the parts are united by welding.

If it is not deemed desirable to form steady-pins on the blanks, then bars of smaller cross-section may be used, each having but one edge converted into steel, which is effected by packing the bars in pairs, so that the adjacent edges of a pair will be in contact, and so that a space will be left for charcoal between the edges of adjacent pairs.

The section of each bar, when converted, is represented in diagram B, and sections of blanks rolled therefrom, suited for summer and winter calks are seen at C and D. In all the figures and diagrams, the steel and iron are represented by colors, the steel being marked $s$ and the iron $i$.

By suitable punching or cutting-mechanism the blank is separated into calks of any desired length, which are given any curve needed to conform to the outline of a shoe at its toe. The web from which the steady-pins $b$ are formed, is marked $a$.

Figure 1:
Figure 2:
Figure 4:
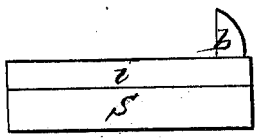
Figure 4 is a side view of one of my improved calks.
Figure 5:
Figures 5 and 6 are end views of summer and winter calks, steady-pins $b$ being shown integral with the calks in each of said three figures.
Figure 6:
Figure 3:
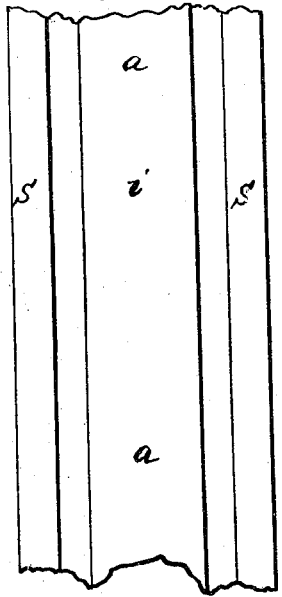
Figure 3:
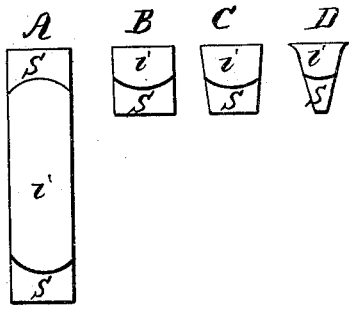

I claim a calk or calk-blank, having a relative disposition of iron and steel, produced and shaped substantially as described.

THOMAS DOOLEY.

Witnesses:
 J. B. CROSBY,
 FRANCIS GOULD.